UNITED STATES PATENT OFFICE.

CHARLES A. HONIG, OF ST. LOUIS, MISSOURI.

DRESSING FOR AUTOMOBILE-TOPS AND THE LIKE.

1,353,239.   Specification of Letters Patent.   Patented Sept. 21, 1920.

No Drawing.   Application filed September 2, 1919.   Serial No. 321,149.

*To all whom it may concern:*

Be it known that I, CHARLES A. HONIG, a citizen of the United States, and resident of St. Louis and State of Missouri, have invented certain new and useful Improvements in Dressing for Automobile-Tops and the like, of which the following is a specification containing a full, clear, and exact description thereof.

My invention relates to a composition of matter for use in the treatment of leather and cloth, and especially adaptable for treatment of automobile tops of all kinds, such as leather, cloth and rubber.

My composition consists of turpentine asphaltum or a solution of asphaltum and spirits of turpentine, japan, boiled linseed oil, turpentine, neat's-foot oil, dissolved rubber, Prussian blue ground in oil.

In preparing my composition of matter, for illustration in making a gallon of the same, I take about one half gallon of turpentine asphaltum, one and one half pints japan, one half pint boiled linseed oil, one and one half pints turpentine, one fourth pint neat's-foot oil, two ounces of pure rubber, one-fourth pint of a mixture of Prussian blue ground in linseed oil.

All the foregoing ingredients are liquids and are mixed together. The rubber is a solid, but the turpentine in the composition dissolves the same. In order for the rubber to be dissolved readily I comminute the same finely.

After the composition has been prepared as heretofore described it is ready for use, and I have found it very serviceable for automobile leather and rubber tops, and cloth tops. By applying a sufficient amount on a cloth top it acts as a waterproofing preparation.

Having fully described my invention what I claim is:

1. A composition of matter for automobile tops and the like, consisting of turpentine asphaltum, japan, boiled linseed oil, turpentine, rubber, neat's-foot oil and Prussian blue.

2. A composition of matter for the treatment of automobile tops and the like, consisting in one gallon of the composition, of about one-half gallon turpentine asphaltum, one and one-half pints japan, one-half pint boiled linseed oil, one and one-half pints turpentine, one-fourth pint neat's-foot oil, two ounces rubber, one-fourth pint Prussian blue.

In testimony whereof, I have signed my name to this specification, in the presence of two subscribing witnesses.

CHARLES A. HONIG.

Witnesses:
JEAN GOLDBERG,
EDWARD E. LONGAN.